United States Patent [19]
Green

[11] 3,940,574
[45] Feb. 24, 1976

[54] REPRODUCTION OF INFORMATION FROM INFORMATION-BEARING DISCS

[75] Inventor: Leland Dale Green, Sierra Madre, Calif.

[73] Assignee: Xerox Corporation, Stamford, Conn.

[22] Filed: Dec. 20, 1973

[21] Appl. No.: 426,989

[52] U.S. Cl. ............... 179/100.1 B; 179/100.41 G
[51] Int. Cl.² ......................................... G11B 9/06
[58] Field of Search ............ 179/100.1 B, 100.4 M, 179/100.41 E, 100.41 G, 4 R; 178/6.6 TP, 6.6 A; 235/61.11 H, 12 N

[56] References Cited
UNITED STATES PATENTS

| | | | |
|---|---|---|---|
| 1,590,399 | 6/1926 | Tykocinski-Tykociner.. | 179/100.1 B |
| 3,040,124 | 6/1962 | Camras ........................... | 178/6.6 TP |
| 3,132,242 | 5/1964 | Cutaia............................ | 235/61.11 H |
| 3,159,718 | 12/1964 | Richardson ................... | 179/100.1 B |
| 3,165,580 | 1/1965 | Camras ......................... | 179/100.1 B |
| 3,358,289 | 12/1967 | Lee ................................ | 179/100.1 B |
| 3,566,084 | 2/1971 | Watson ......................... | 235/61.11 H |
| 3,767,848 | 10/1973 | Schuller et al. ............... | 179/100.4 R |
| 3,783,196 | 1/1974 | Stanley.......................... | 179/100.4 M |
| 3,831,008 | 8/1974 | Bradshaw...................... | 235/61.11 H |
| 3,872,241 | 3/1975 | Adler et al. ................... | 179/100.1 B |

*Primary Examiner*—Vincent P. Canney
*Attorney, Agent, or Firm*—J. E. Beck; T. J. Anderson; Leonard Zalman

[57] ABSTRACT

Reproducing the information stored in the spiral track of a record-type information-bearing disc is achieved by uniformly charging the surface of the disc by means of a corona-generating device disposed in proximity to the disc, and, thereafter, using a conductive stylus riding in the track of the disc to pick up the charge from only the peak points of the track. All peaks are at the same height. The system preferably uses FM encoding, and the information is carried by the track according to the peak-to-peak spacing. The stylus is shaped in relation to the track such that it may not touch the peaks in the track. The stylus contacts the sides of the track for tracking purposes. An air breakdown between the peaks and the metallic portion of the stylus results in the signal picked up by the stylus.

3 Claims, 5 Drawing Figures

REPRODUCTION OF INFORMATION FROM INFORMATION-BEARING DISCS

BACKGROUND OF THE INVENTION

In recent years systems have been devised which record information on a storage medium and provide a subsequent reproduction of the information from the storage medium. For the recording of high frequency information, such as video information, the systems now in use generally employ magnetic tapes as the storage medium. These tapes have proved fairly successful in recording signals representative of information and in obtaining the reproduction of the information. However, the magnetic structure of the tape limits the fidelity of the recording and reproduction so that the magnetic tapes have to be manufactured with considerable precision. The information recorded on the magnetic tapes also has a limited density of information so that a relatively great amount of tape is required to store information such as that required for a television program having a duration of one-half an hour or an hour. The limited density of information packing on the tape has resulted from limitations in the speed of response of the magnetic transducer heads which are disposed in contiguous relation to the tape.

In the systems now in use, a transducing head is generally disposed adjacent to the tape to record information in magnetic form on the tape and to reproduce the magnetic information as electrical signals from the tape. The adjacent relationship between the transducing head and the tape occasionally causes the tape to rub against the head so that magnetic particles become removed from the tape and deposited on the head to effect the operation of the head. The magnetic particles on the tape tend to produce an abrasive action on the head, thereby permanently affecting the response characteristics of the head.

It is also disadvantageous to use a magnetic tape as a master for the reproduction of a large quantity of data because of the considerable length of tape required for the master. It would, therefore, be more desirable to use discs as the master since they tend to store information in a more compact form than tapes. The disc systems of the prior art are generally of two types. In one system the light transmission characteristics of a spiral track in the discs is varied during the recording operation by an electron beam whose characteristics are controlled by signals representative of the video information to be stored. Reproduction of the signals from the disc is accomplished by directing a light beam at the disc and by modifying the light beam in accordance with the light transmission characteristics previously provided at successive portions on the spiral track of the disc. The modified light beam is detected to obtain a recovery of information previously recorded on the disc. This type of system is described in U.S. Pat. No. 3,361,873.

In another type of prior art system, a disc having a spiral track and a stylus similar to that used in high fidelity phonograph records is used. The information is recorded as vertical variations in the depth of the groove in a frequency-modulated form, and the stylus is coupled to a pressure transducer. Due to the abrupt trailing edge of the stylus, a pressure signal is detected indicative of the peak-to-peak spacing and hence the frequency modulated information.

Another type of readout device is the electrostatic pickup. This type of pickup is similar to the electrostatic pickup used in phonograph records wherein capacitive relief or a capacitor needle is used. The variation of the capacity of the needle or the instantaneous capacity at the peak in the track cause the oscillation frequency of a tuned circuit to vary above and below the normal mid-frequency, thereby resulting in a frequency modulated signal which is delivered to a suitable output circuit, as described in U.S. Pat. No. 2,423,208, and British Pat. No. 153,300.

The disc systems of the prior art have had certain important deficiencies; for example, the latter systems have a frequency response that may be too low to allow for a reasonable length of play time or for color encoding. In addition, the stylus constuction of those systems using capacitive relief is often very complicated, as disclosed in U.S. Pat. No. 2,423,208.

SUMMARY OF THE INVENTION

It is an object of the present invention to provide for improved reproduction of information stored on a record-type disc.

It is another object of the present invention to provide an improved system for reproducing information directly from a record-type disc.

It is a further object of the present invention to increase the information content that can be reproduced from the track of a record-type disc.

In accordance with the invention, conversion of the mechanical variations in a track of a disc into an electrical signal is achieved by exposing the disc to a corona source just prior to the disc being played to thereby deposit a charge on the surface of the disc, and then passing a conductive stylus through the track. Due to the design of the stylus, which is shaped to just barely touch the high points or peaks in the track, the charge on the peaks is collected, resulting in a current which is indicative of the variation or modulation of the peaks in the track. The surface charge in the "valleys" would not be collected. The charge collected is usable directly, after amplification, as the frequency modulated signal, there being no variation in oscillator frequency as in the "capacitive-relief" systems. To have a sufficiently high field to hold the charge on the surface of the disc, it may be necessary to manufacture the disc with a thin metallic layer within or on the side of the disc opposite the track; however, a grounded turntable might be sufficient. Also, the stylus could be elongated to reduce the pressure against the sides of the track. A slight separation may exist between the peaks and the conductive portion of the stylus, resulting in signal pickup by an air breakdown between the peaks and the conductive portion of the stylus.

Othe objects of the invention will become readily apparent to those skilled in the art in view of the following detailed disclosure and description thereof, especially when read in conjunction with the accompanying drawings.

DESCRIPTION OF THE PREFERRED EMBODIMENT

The system and method described herein provides a novel technique for converting the modulations in the track or groove on the surface of a plastic or other non-conducting disc directly into an electrical information-bearing signal. The modulations are desirably in a frequency modulation encoding, with the information carried in the peak-to-peak or ripple-to-ripple spacing, and the electrical signal having an FM encoding. The technique, involving applying a corona charge to the surface of the disc, is particularly useful in relation to T.V. records wherein T.V. programs are recorded, stored on the disc, and then played back. The disc, acting as a storage medium, would be in a form which would allow them to be mechanically reproduced and marketed as pre-recorded records. The user would have a player of the type described hereinafter which would retrieve the information pre-recorded on the disc and develop therefrom an appropriate T.V. or other electrical signal.

Figure 1:
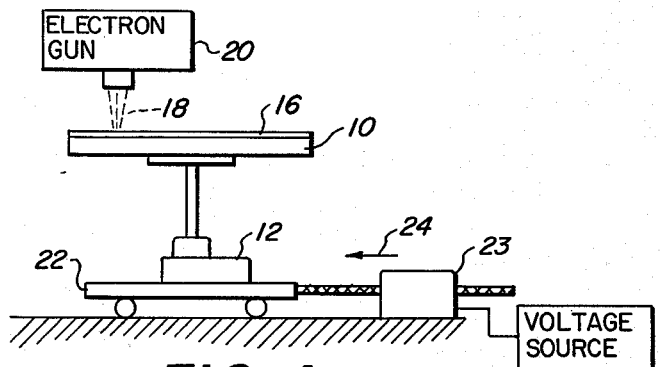
FIG. 1 is a schematic illustration of a system suitable for recording information in the spiral track of a disc.

Referring now to FIG. 1, which illustrates an exemplary system for recording information on the spiral track of a disc 10, disc 10 is driven by a motor 12 to rotate at a substantially constant speed. The disc 10 may be made of glass, or quartz or any other suitable non-conducting material. Disc 10 has on its surface a photographic coating 16 which is responsive to charge particle bombardment in the form of a beam 18. The intensity of the beam of charge particles may be controlled by adjusting the potential on the grid (not shown) of stationary electron gum 20 in accordance with the characteristics of the information to be recorded. In the case where a frequency modulated signal is produced in coating 16, the beam may be switched on and off, or between set amplitude limits, to produce the required frequency modulation, that is, constant amplitude peaks with the peak-to-peak spacing carrying the frequency modulated information. An electro-mechanical scheme also could be used to record the information in coating 16.

The disc 10 is moved longitudinally by means of a carriage 22 and driver 23, as indicated by the arrow 24. As the disc 10 rotates and moves longitudinally, a spiral track of information is accordingly produced in photographic form on the coating 16 of the disc 10. Apparatus for controlling errors in rotational and longitudinal movement of disc 10, and eccentric rotation of disc 10, are described in U.S. Pat. No. 3,361,873.

Figure 2:
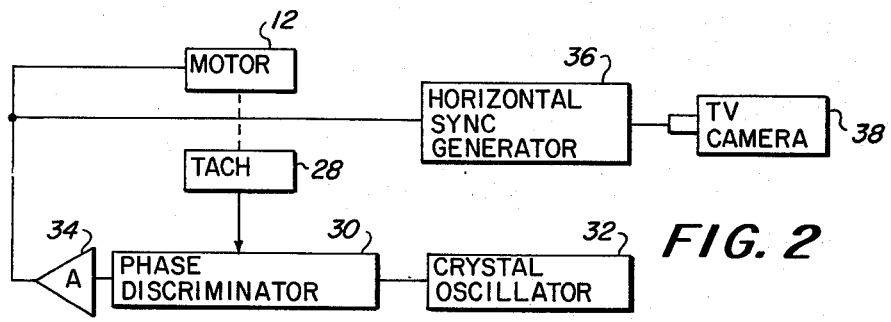
FIG. 2 is a block diagram of an electrical system for controlling the operation of the motor that rotates the disc shown in FIG. 1, and for controlling the recording of information on the disc.

FIG. 2 shows a circuit for controlling motor 12 to obtain a rotation at a constant speed. A tachometer 28 is mechanically coupled to the motor 12 to develop an electrical signal having a frequency in accordance with the speed of rotation of the motor 12. The signal from the tachometer 28 is applied to a phase discriminator 30 which also receives a constant frequency signal from a crystal oscillator 32. The phase discriminator detects any difference in phase between the signals supplied by the tachometer and by the crystal oscillator to produce a control signal having a polarity and intensity dependent upon any difference in phase. The control signal from the phase discriminator 30 passes through an amplifier 34 to control the speed of motor 12.

Another feature of the circuit of FIG. 2 is frequency control of a horizontal sync generator in accordance with the speed of the motor 12. This ensures that the information supplied to the electron gun 20 is at the same rate at which the motor 12 is rotating. As shown in FIG. 2, horizontal sync generator 36 is connected to amplifier 34 to produce signals at a variable frequency related to the controlled speed of the motor 12. Horizontal sync generator 36 is connected to a television camera 38 to control the rate at which the information detected by the television camera is applied to the electron gun 20 illustrated in FIG. 1. For example, if motor 12 is driven at a rate of 30 cycles per second, the horizontal sync generator generates a sync signal of 15,750 cycles per second. This is the normal sync signal in a television system to produce a frame rate of 30 cycles per second when there are 525 lines in the television picture. Therefore, all of the information recorded on the spiral track of the disc 10 along a radial line extending from the center of the disc represents the same position on the television screen in successive frames when the information on the disc is reproduced. Thus, each complete revolution of the disc 10 causes a successive frame to be recorded or reproduced, and each adjacent radial position on the disc represents the same position on a picture in the successive frames.

Since there is usually very little difference between successive frames of a television picture, the difference between the level of the information on adjacent radial points of the spiral track would usually be small. This is desirable since it minimizes cross-talk between information at successive radial positions on the disc. Also, should the reproducing system somehow skid slightly across the track, picture distortion would not be greatly affected.

Figure 4:
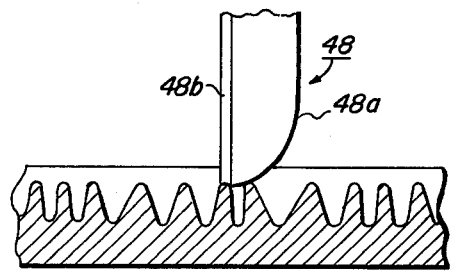
FIG. 4 is an elongated view of the stylus needle and the peaks and valleys of a portion of the track in the disc shown in FIG. 3.
Figure 3:
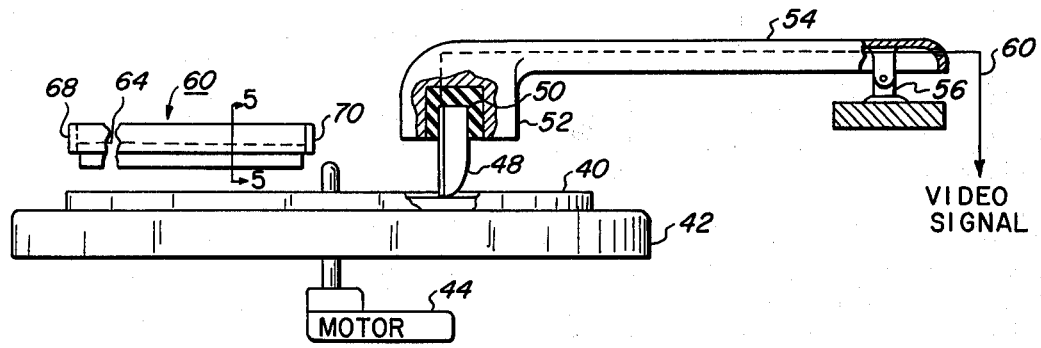
FIG. 3 is a schematic of the novel information reproducing system according to the present invention.

FIG. 3 shows a schematic representation of a system, in accordance with the invention, for reproducing information from an information-bearing disc. Either the disc 10 can be used directly or a mechanical transfer of the information may be made to a relatively thin disc, illustrated as 40 in FIG. 3. The disc 40 rests on a turntable 42 and, when reproduction is occurring, is rotated at a constant speed by a motor 44. A needle or stylus 48 is mounted in a block of insulating material 50 carried by a head 52 forming part of a pick-up arm 54 which is pivotably mounted on a mounting member 56 for swinging movement over disc 40 in a well known manner. Needle 48 is connected to a wire 60 by which the desired video signal flows due to the interaction of the needle 48 and the charge on the peaks in the track of disc 40. FIG. 4 shows a side view of a small portion of the track of disc 40 with the needle 48 therein. As shown, the needle just barely touches the tops of peaks, the peak-to-peak spacing providing the frequency modulation encoding. The needle 48 has an elongated, non-conductive position 48a to reduce the pressure against the sides of the track and a thin, for example 0.25 micron thick, strip of a suitable conductor 48b, e.g., aluminum. The wire 60 is connected to conductor 48b.

Figure 5:
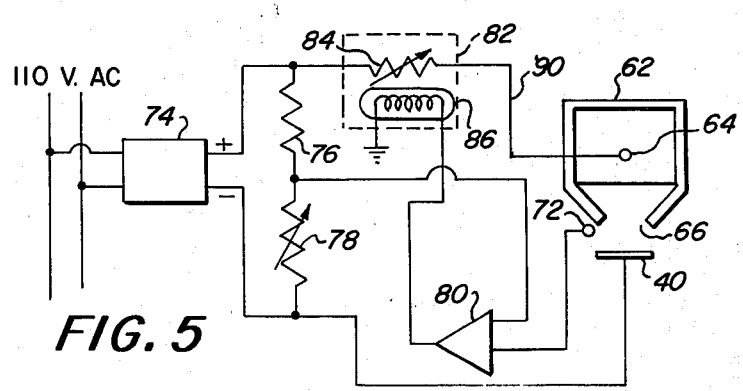
FIG. 5 is a sectional view of the corona charging apparatus shown in FIG. 3, and a schematic diagram of a control circuit used for corona charging apparatus.

Also shown in FIG. 3 is a corona generating or electrostatic charging device 60 which is exemplary of one practical embodiment of a structure for providing a corona charge on the surface of disc 40. As seen in FIG. 5, which includes a sectional view of the corona generating device 60, the corona structure comprises an electrode shield 62 partially surrounding a corona discharge wire 64. The sidewalls of shield 62 terminate in converging portions, each arranged at an angle of approximately 45° to its sidewall and spaced apart to effect a corona discharge opening or aperture 66 at the bottom of approximately ½ inch width. The wire 64 can be any suitable non-corrosive material such as stainless steel, a platinum alloy or other suitable material, having a uniform exterior and a diameter of approximately 0.0035 inches. The high voltage wire 64 is stretched between and attached to blocks 68 and 70 of insulating material which are arranged between the sidewalls and attached at the ends of the shield by means of fastening screws (not shown) extending through the top walls and into the insulating blocks, or in any other suitable fashion. The mounting block 68 has attached thereto a conductive finger (not shown) for engagement with a suitable conductor 90 carrying a high voltage as is usual in this type of device. The shield 62 is provided with a terminal (not shown) which is grounded in any suitable fashion.

If desired, a wire 72, approximately the length of the corona wire 64 and parallel to it, is positioned near the opening 66. The wire 72 acts as a current, or corona detector, detectingg a portion of the current from corona discharge that it attracted to the shield 62. It has been determined (see U.S. Pat. No. 3,604,925) that the current detected by wire 72 is related to the potential on the charging surface, disc 40. The source of current in wire 72 is believed to be the current which normally flows to the shield, and hence no effect upon corona charging efficiency is experienced. The cross-sectional structure of the corona wire shield is not necessarily limited to a rectangular configuration. Such a form is preferred from the standpoint of ease of manufacture and assembly. Obviously, a circular or similar configuration can be employed.

Referring again to FIG. 5, an illustrative embodiment of the charging circuit for the corona discharge device 60 is shown. A d.c. source 74 is connected to a source of alternating-current, such as a commercial outlet of 110 volts a.c., for producing a potential difference in the range of approximately 6,000 to 11,000 volts. The positive terminal of source 74 is connected via a conductor to one terminal of a resistor 76, the other terminal of which is connected to a terminal of variable resistor 78. The negative terminal of source 74 is connected to the other terminal of resistor 78 and to disc 40. To provide a sufficiently high electrostatic field to hold charges on the surface of the disc 40, it may be necessary to manufacture the disc 40 with a thin metallic plate inside the surface of the disc; the plate would be grounded. Grounding could be accomplished at the hub of the disc or by using a conductive plastic as the primary substrate of the disc. Hence, the disc could be a thin (0.5 mil) layer of non-conducting plastic sandwiched to a thick (20 mil) sheet of conducting plastic. During the pressing operation, the grooves would be impressed into the thin non-conducting layer. Another method of constructing the disc would be to manufacture it in a process similar to the process used to make long-play records. The vinyl surface would be coated first with a layer of aluminum, and then with a layer of silicon dioxide. The disc track would be stamped into the silicon dioxide layer with the aluminum layer being grounded.

Returning again to FIG. 5, the wire or probe 72 is connected to one input of differential amplifier or comparator 80. The junction point of resistors 76 and 78 is coupled to the other input of amplifier 80. The shield is connected to ground, as shown. The positive terminal of power supply 74 is also coupled to one input of a variable impedance device 82. The output of amplifier 80 is connected to the other input of variable impedance means 82. Resistors 76 and 78 and variable impedance means 82 form a voltage divider network supplying voltage to corona wire 64. The variable impedance means 82 may take many forms, and it is schematically illustrated as comprising a photoconductor 84, the resistance value of which is dependent upon the amount of light energy produced by adjacent light bulb 86. The light generated by light bulb 86 is dependent, in turn, upon the current output of amplifier 80.

In operation, variable resistance 78 is initially adjusted to a value to produce a corona wire-to-plate potential which will produce the desired amount of electrostatic charge on plate 40, desirably about 500 volts. In this initial or quiescent condition, the current output from amplifier 80, by varying the light output of bulb 86, has adjusted the resistance value of photoconductor 84 such that the voltage drop across photoconductor 84 will be of a magnitude so that the proper corona wire-to-plate potential is attained. The above is true as long as all the conditions, such as temperature, humidity, pressure, voltage potential on the disc, spacing between the wire 64 and the disc 40, and the evenness of the plate 40 remain constant. In the event that there is any change in any of these conditions, there will be a corresponding variation in the corona current produced by wire 64. This change is detected by wire or probe 72. It should be noted that the detector may take other forms than that recited hereinabove. This current variation changes the current appearing at the input to amplifier 80 from the balanced condition. If the current detected by wire 72 is less than the quiescent value determined by resistor 78, amplifier 80 will generate a current which is larger than the quiescent current. This increased current will increase the light output from light bulb 86, thereby decreasing the resistance value of photoconductor 84. The voltage drop across the variable impedance 82 will therefore be less than the quiescent voltage drop and the resulting potential between wire 64, and the plate 40 will be increased until the initial quiescent potential value is attained. The converse is true if the current detected by wire 72 is greater than the initial quiescent current produced by resistor 78. More detailed descriptions of suitable corona charging devices may be found in U.S. Pat. Nos. 2,868,989, 2,576,047, and 3,604,925.

In practice, the record disc 40 would be exposed to the corona-generating device 60 just prior to being played, that is, disc 40 would be rotated and corona generator device 60 would be energized, for example, for 3 seconds, and then deenergized. There must be sufficient rotation of disc 40 while generator 60 is energized such that a change of about 500 volts is deposited uniformly across the entire upper, grooved surface of disc 40. It is also contemplated that the corona-generating device 60 may rotate to produce the required charging of disc 40. After deenergization of the corona source, the needle 48 is placed, either manually or mechanically, into the track in disc 40. As the conductive portion 48b of needle 48 comes in contact with the peaks of the mechanical ridges of the track, a charge collection, in the form of current pulses, will occur. Charge collection may result from air breakdown. The charge collection will result in an FM signal, the frequency modulation corresponding to the peak-to-peak spacing modulation (indicated as video in FIG. 3), which can be amplified, demodulated, encoded into a proper T.V. signal and applied to a conventional T.V. receiver as the video signal. As previously noted, the charges in the valleys of the mechanical ridges of the track do not contribute to the video signal.

A summary of acceptable exemplarly disc parameters are: disc speed: 1,800 rpm; grooves per inch: 5,400 groove spacing: $0.185 \times 10^{-3}$ inches; groove depth: $0.93 \times 10^{-3}$ inches; and groove valley depth: $0.185 \times 10^{-3}$ inches. With the foregoing disc dimensions and assuming a needle contact area of $(2.5 \times 10^{-6}$ meters$)^2$, a dielectric constant of 4, a dielectric thickness of $10^{-5}$ meters, a dwell time of $5 \times 10^{-7}$ seconds, and a surface voltage of 500 volts, a stylus current, from the formula $I_s = CV/t$, of $2.2 \times 10^{-8}$ amps, is generated at each peak point. With a load resistance of 50K, the output voltage would be about 1 millivolt, a reasonable signal voltage.

The advantages of the technique disclosed are that: (1) the pressure between the record or disc and the stylus may be less, providing greater stylus and record life; (2) that the stylus assembly may be less expensive to manufacture since a complicated needle is not necessary; and, most important, (3) it may be possible to increase the information content along the length of the track, thereby providing higher information content per disc. The latter advantage would allow the playng time per disc to be increased, or color encoding to be added, or both.

As an alternate technique, the stylus could be constructed such that it would charge the surface of the disc as well as collect charges from the peaks in the disc. The stylus need not touch the peaks in the track as long as the stylus passes close enough to the peaks such that charge will be collected by an air breakdown or corona effect.

While the invention has been described with reference to preferred arrangments thereof, it will be understood to those skilled in the art that various changes may be made without departing from the true spirit and scope of the invention as set forth in the appended claims.

What is claimed is:

1. A method of reproducing information from a surface of an information-bearing disc wherein information is stored in accordance with the spacing between area of peak amplitude of a spiral track on said surface of said disc, and a stylus rides in the spiral track of said disc comprising:
    depositing electrostatic charges uniformly on said surface of said disc, and
    collecting said electrostatic charges from only the areas of peak amplitude of said spiral track of said surfaces of said disc, said collection of charge being achieved by the flow of said electrostatic charge from said areas of peak amplitude of said spiral track of said surface of said disc to said stylus riding in said spiral track of said disc.

2. A method of reproducing information from a surface of an information-bearing disc wherein the information is stored in accordance with the spacing between areas of peak amplitude of a spiral track of said surface of said disc, and a stylus riding in the spiral track of said disc comprising:
    uniformly electrostatically charging said surface of said disc, and
    collecting said electrostatic charge from only the areas of peak amplitude of said spiral track of said surfaces of said disc; said collection of charge being achieved by the flow of said electrostatic charge from said areas of peak amplitude of said spiral track of said surface of said disc to said stylus riding in said spiral track of said disc.

3. Apparatus for reproducing information from an information-bearing disc wherein the information from an information-bearing disc wherein the information is stored in accordance with the spacing between areas of peak amplitude of a spiral track on a surface of said disc, and a stylus riding in the spiral track of said disc comprising:
    first means for uniformly electrostatically charging said surface of said disc, and
    stylus means riding in said spiral track for collecting said electrostatic charge from only the areas of peak amplitude of said spiral track of said surface of said disc by a flow of said charge from said areas of peak amplitude of said spiral track to said stylus means.

* * * * *

UNITED STATES PATENT AND TRADEMARK OFFICE
CERTIFICATE OF CORRECTION

PATENT NO. : 3,940,574
DATED : February 24, 1976
INVENTOR(S) : Leland Dale Green It is certified that error appears in the above-identified patent and that said Letters Patent are hereby corrected as shown below:

Claim 1, line 4, "area" should be --areas-- line 11, "surfaces" should be --surface--

Claim 2, line 11, "surfaces" should be --surface--

Claim 3, lines 2 and 3, "wherein the information from an information-bearing disc" should be deleted.

Signed and Sealed this eleventh Day of May 1976

[SEAL]

Attest:

RUTH C. MASON
Attesting Officer

C. MARSHALL DANN
Commissioner of Patents and Trademarks